US009720151B1

(12) United States Patent
Subramania et al.

(10) Patent No.: US 9,720,151 B1
(45) Date of Patent: Aug. 1, 2017

(54) BROADBAND LIGHT FUNNELING IN ULTRASUBWAVELENGTH CHANNELS HAVING PERIODIC CONNECTED UNFILLED APERTURES

(71) Applicants: National Technology & Engineering Solutions of Sandia, LLC, Albuquerque, NM (US); University of Exeter, Exeter, Devon (GB)

(72) Inventors: Ganapathi Subramanian Subramania, Albuquerque, NM (US); Igal Brener, Albuquerque, NM (US); Stavroula Foteinopoulou, Albuquerque, NM (US)

(73) Assignees: National Technology & Engineering Solutions of Sandia, LLC, Albuquerque, NM (US); University of Exeter, Exeter, Devon (GB)

( * ) Notice: Subject to any disclaimer, the term of this patent is extended or adjusted under 35 U.S.C. 154(b) by 223 days.

(21) Appl. No.: 14/048,665

(22) Filed: Oct. 8, 2013

Related U.S. Application Data

(60) Provisional application No. 61/712,123, filed on Oct. 10, 2012.

(51) Int. Cl.
*G02B 5/20* (2006.01)
*G02B 5/00* (2006.01)
(Continued)

(52) U.S. Cl.
CPC ............. *G02B 5/208* (2013.01); *G02B 5/008* (2013.01); *G02B 6/107* (2013.01); *G02B 1/002* (2013.01); *G02F 2202/30* (2013.01)

(58) Field of Classification Search
None
See application file for complete search history.

(56) References Cited

U.S. PATENT DOCUMENTS 8,599,486 B2 * 12/2013 Najiminaini ......... G02B 26/007
359/619
2009/0097811 A1 * 4/2009 Hadzialic ............... B82Y 20/00
385/131

(Continued)

OTHER PUBLICATIONS

T.W. Ebbesen et.al., "Extraordinary optical transmission through sub-wavelength hole arrays", Nature, (1998), pp. 667-669, vol. 391.
(Continued)

*Primary Examiner* — Jennifer L Doak
*Assistant Examiner* — Ryan S Dunning
(74) *Attorney, Agent, or Firm* — Kevin W. Bieg

(57) ABSTRACT

A structure for broadband light funneling comprises a two-dimensional periodic array of connected ultrasubwavelength apertures, each aperture comprising a large sub-aperture that aids in the coupling of the incoming incident light and a small sub-aperture that funnels a significant fraction of the incident light power. The structure possesses all the capabilities of prior extraordinary optical transmission platforms, yet operates nonresonantly on a distinctly different mechanism. The structure demonstrates efficient ultrabroadband funneling of optical power confined in an area as small as $\sim(\lambda/500)^2$, where optical fields are enhanced, thus exhibiting functional possibilities beyond resonant platforms.

15 Claims, 7 Drawing Sheets

(51) Int. Cl.
*G02B 6/10* (2006.01)
*G02B 1/00* (2006.01)

(56) References Cited

U.S. PATENT DOCUMENTS

| | | | | |
|---|---|---|---|---|
| 2010/0006144 | A1* | 1/2010 | Baumberg | H01L 31/03529 136/255 |
| 2010/0118390 | A1* | 5/2010 | Blair | B82Y 20/00 359/346 |
| 2010/0206380 | A1* | 8/2010 | Lindquist | B82Y 10/00 136/261 |
| 2011/0006284 | A1* | 1/2011 | Cho | B82Y 20/00 257/14 |
| 2012/0019901 | A1* | 1/2012 | Mazumder | G02F 1/1326 359/320 |
| 2012/0154919 | A1* | 6/2012 | Hu | B82Y 20/00 359/614 |

OTHER PUBLICATIONS

H.A. Bethe, "Theory of Diffraction by Small Holes", The Physical Review, (1944), pp. 163-182, vol. 66, No. 7 and 8.
C.J. Bouwkamp, "Diffraction Theory", Reports on Progress in Physics, (1954), pp. 35-100, vol. 17.
C. Genet, et.al., "Light in tiny holes", Nature, (2007), pp. 39-46, vol. 445.
H.F. Ghaemi, et.al., "Surface plasmons enhance optical transmission through subwavelength holes", Physical Review B, (1998), pp. 6779-6782, vol. 58, No. 11.
F.J. Garcia-Vidal, et.al., "Light passing through subwavelength apertures", Reviews of Modern Physics, (2010), pp. 729-787, vol. 82.
S. Foteinopoulo, et.al., "Optical near-field excitations on plasmonic nanoparticle-based structures", Optics Express, (2007), pp. 4253-4267, vol. 15, No. 7.
X.R. Huang, et.al., "Making Metals Transparent for White Light by Spoof Surface Plasmons", Physical Review Letters, (2010), pp. 243901-1-243901-4, vol. 105.
X. Shi, et.al., "Ultrahigh light transmission through a C-shaped nanoaperture", Optics Letters, (2003), pp. 1320-1322, vol. 28, No. 15.
J.A. Matteo, et.al., "Spectral analysis of strongly enhanced visible light transmission through single C-shaped nanoaperture", Applied Physics Letters, (2004), pp. 648-650, vol. 85, No. 4.
K. Tanaka, et.al., "Optimized computer-aided design of I-shaped subwavelength aperture for high intensity and small spot size", Optics Communications, (2004), pp. 231-244, vol. 233.
L. Tang, et.al., "C-shaped nanoaperture-enhanced germanium photodector", Optics Letters, (2006), pp. 1519-1521, vol. 31, No. 10.
A. Alu, et.al., "Plasmonic Brewster Angle: Broadband Extraordinary Transmission through Optical Gratings", Physical Review Letters, (2011), pp. 123901-1-123902-4, vol. 106.
P. Yeh, "A New Optical Model for Wire Grid Polarizers", Optics Communications, (1978), 289, vol. 26, No. 3.
P. Song, et al., "Quantum mechanical study of the coupling of plasmon excitations to atomic-scale electron transport", The Journal of Chemical Physics, (2011), 074701, vol. 134.
D. Psaltis, et al., "Developing optofluidic technology through the fusion of microfluidics and optics", Nature, (2006), 381, vol. 442.
C. Yu, et al., "Mid-IR Biosensor: Detection and Fingerprinting of Pathogens on Gold Island Functionalized Chalcogenide Films", Analytical Chemsitry, (2006), 2500, vol. 78, No. 8.
Baillergeau, M. et al., "Diffraction-limited ultrabroadband terahertz spectroscopy", Scientific Reports 6, Article No. 24811 (2016), 7 pages, doi:10.1038/srep24811.

* cited by examiner

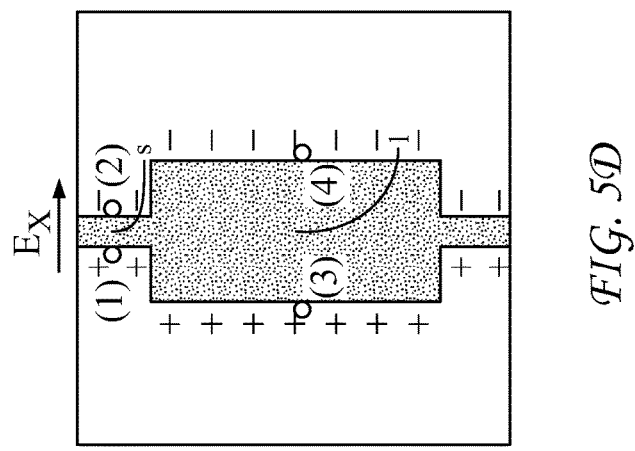
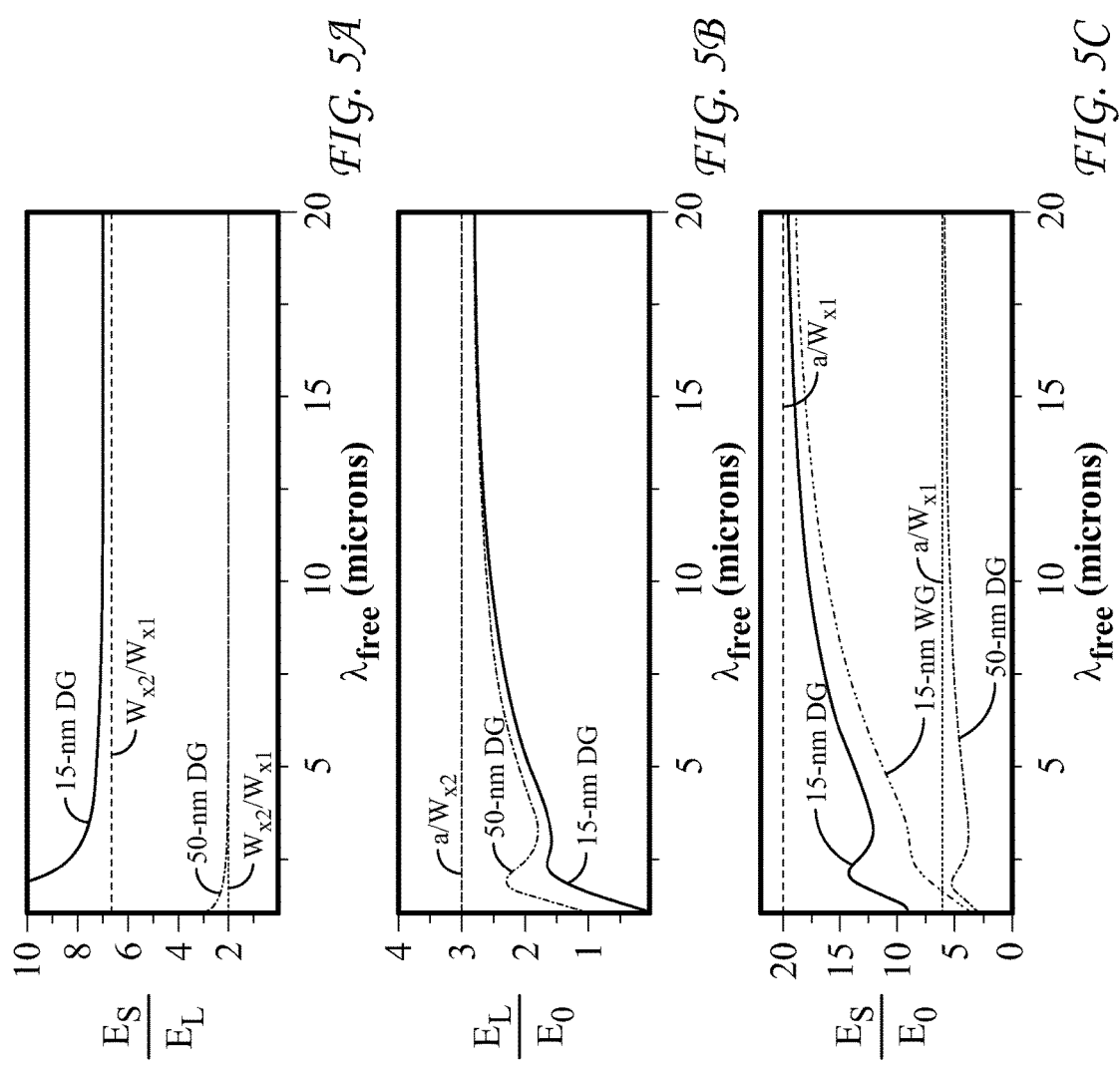
FIG. 5A  FIG. 5B  FIG. 5C  FIG. 5D

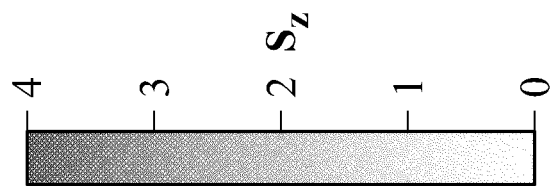
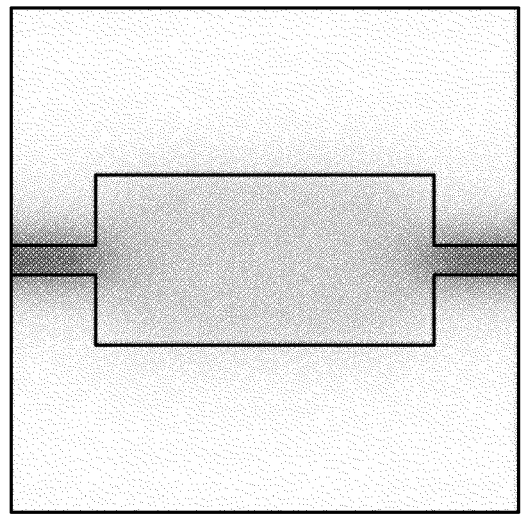
FIG. 8B
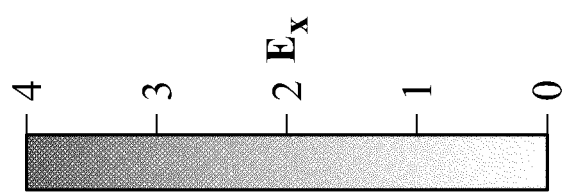
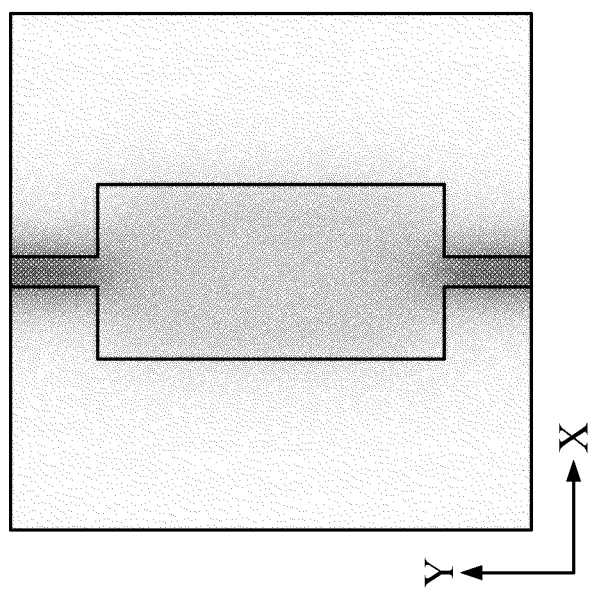
FIG. 8A

BROADBAND LIGHT FUNNELING IN ULTRASUBWAVELENGTH CHANNELS HAVING PERIODIC CONNECTED UNFILLED APERTURES

CROSS-REFERENCE TO RELATED APPLICATION

This application claims the benefit of U.S. Provisional Application No. 61/712,123, filed Oct. 10, 2012, which is incorporated herein by reference.

STATEMENT OF GOVERNMENT INTEREST

This invention was made with Government support under contract no. DE-AC04-94AL85000 awarded by the U. S. Department of Energy to Sandia Corporation. The Government has certain rights in the invention.

FIELD OF THE INVENTION

The present invention relates to the confinement and enhancement of light and, in particular, to a structure for broadband light funneling in ultrasubwavelength channels.

BACKGROUND OF THE INVENTION

Confining and enhancing light within deep subwavelength volumes is key to the enhancement of light-matter interaction, with great implications in the control of absorption and emission rates, as well as in attaining high optical nonlinearities and/or gain. However, certain applications also crucially require efficient power funneling of the confined and enhanced electromagnetic fields. Such a phenomenon was demonstrated for the first time in a thin silver film patterned with subwavelength-sized cylindrical holes. See T. W. Ebbesen et al., *Nature (London)* 391, 667 (1998). In that work, the transmitted light is beyond the expectations of Bethe's theory and twice the amount predicted from a simple analysis based on the area fraction of the holes. See H. A. Bethe, *Phys. Rev.* 66, 163 (1944); and C. J. Bouwkamp, *Rep. Prog. Phys.* 17, 35 (1954). Therefore, such a phenomenon was termed as an extraordinary optical transmission (EOT). An important goal has been towards optimization of the pertinent features of the phenomenon: field confinement and enhancement, and power throughput exceeding the area fraction of the holes. See C. Genet and E. Ebbesen, *Nature (London)* 445, 39 (2007) and references therein. It is now widely accepted that the EOT phenomenon is a resonant phenomenon mediated by surface plasmon excitation. See H. F. Ghaemi et al., *Phys. Rev. B* 58, 6779 (1998); and F. J. Garcia-Vidal et al., *Rev. Mod. Phys.* 82, 729 (2010).

Resonant phenomena unavoidably have a narrow spectral bandwidth. There can be some rather limited control of the bandwidth by engineering the interaction between resonances. For example, by exploiting coupled resonances, a broadened bandwidth was observed in the enhancement around nanoparticle dimers or in the transmission through a metallic grating. Typically, this type of approach would require fine tuning of the structural features: size, shape, and/or angle of wave incidence. See S. Foteinopoulou et al., *Opt. Express* 15, 4253 (2007); X. R. Huang et al., *Phys. Rev. Lett.* 105, 243901 (2010); X. Shi et al., *Opt. Lett.* 28, 1320 (2003); J. A. Matteo et al., *Appl. Phys. Lett.* 85, 648 (2004); K. Tanaka and M. Tanaka, *Opt. Commun.* 233, 231 (2004); and L. Tang et al., *Opt. Lett.* 31, 1519 (2006). It is therefore of utmost interest to explore the possibility to access the attractive features of the EOT phenomenon, pertinent to practical applications, but without invoking any resonances. Very recently, Alu et al. reported a nonresonant approach to a broadband transmission of P-polarized light through a metallic grating structure, occurring at the Brewster angle of the corresponding effective medium. Nevertheless, such a platform does not offer a two-dimensional confinement of the optical fields and leads to poor field enhancement due to the reduced tangential electric field component. See A. Alu et al., *Phys. Rev. Lett.* 106, 123902 (2011). Moreover, the required oblique incidence at large angles can be considerably less practical.

Therefore, a need remains for a two-dimensional structure that simultaneously enables both E-field enhancement with subwavelength power throughput and broadband transmission at near-normal incidence.

SUMMARY OF THE INVENTION

The invention is directed to a structure for broadband light funneling, comprising a two-dimensional periodic array of connected apertures in a thin conducting film, wherein the apertures are ultrasubwavelength to the incident light and wherein each aperture comprises a large sub-aperture that aids in the coupling of the incoming incident light and a small sub-aperture that funnels a significant fraction of the incident light power. For example, the aperture can comprise a large rectangular slit and a small rectangular slit, thereby providing a double-groove structure. The small rectangular slit can have a width $w_{x1}$ and the large rectangular slit can have a larger width $w_{x2}$, and wherein neither $w_{x1}=w_{x2}$ nor $w_{x1}=0$. Alternatively, the aperture can comprise a circular, elliptical, or diamond-shaped sub-aperture. The thin conducting film can comprise a metal, preferably a noble metal, or a highly doped semiconductor. The wavelength of the incident light can preferably be between approximately 0.3 µm and 1000 µm and, more preferably, between approximately 3 µm and 20 µm. If the periodic array has a periodicity of a and the light has a wavelength of λ, λ/a is preferably greater than approximately 10. The periodic array can have a square lattice geometry or a skewed lattice geometry.

The invention described below constitutes the first counterexample to the widespread and intuitive notion that resonances are needed to funnel light with enhanced intensity through deep subwavelength apertures. For example, the invention can use a simple double-groove structure that effectively combines the broadband transmission property of a one-dimensional grating with the field confinement and enhancement properties of subwavelength apertures. See P. Yeh, *Opt. Commun.* 26, 289 (1978). Further, the structure possesses the attractive features of EOT platforms, while being nonresonant and broadband. See C. Genet and E. Ebbesen, *Nature (London)* 445, 39 (2007). The structure described is relatively simple to implement with constantly improving nanofabrication techniques. A higher degree of enhancement is also possible, limited by a lower bound for the small-slit width, imposed by fabrication constraints and the onset of quantum tunneling of charges through the small-slit gap. See P. Song et al., *J. Chem. Phys.* 134, 074701 (2011). The demonstrated capabilities of the inventive structure can be important for optofluidic devices, enhancement of nonlinear phenomena, and improving absorption efficiency in near- and mid-IR detectors. See D. Psaltis et al., *Nature (London)* 442, 381 (2006); and P. Bhattacharya et al., *International Journal of High Speed Electronics and Sys-* tems 12, 969 (2002). The mid-IR wavelength range is of particular interest for molecular fingerprinting or sensing, as well as detectors. See C. Yu et al., *Anal. Chem.* 78, 2500 (2006); and P. Bhattacharya et al., *International Journal of High Speed Electronics and Systems* 12, 969 (2002).

BRIEF DESCRIPTION OF THE DRAWINGS

The detailed description will refer to the following drawings, wherein like elements are referred to by like numbers.

FIGS. 5(a)-(c) are plots versus free space wavelength of: (a) ratio of the electric field amplitudes in the small and large slits; (b) normalized electric field amplitude in the large slit with respect to source amplitude; and (c) normalized electric field amplitude in the small slit with respect to source amplitude. FIG. 5(d) is a schematic illustration of an aperture depicting a simple quasi-static picture of the charge response.

FIG. 8(a) shows the spatial distribution of the x-component of the electric field amplitude ($E_x$) normalized to an input field of 1 V/m, inside the substrate at 20 nm below the bottom of the Au film for the DG structure of FIG. 4(a). FIG. 8(b) shows the spatial distribution of the Poynting vector ($S_z$) at the same plane, normalized to the incident Poynting vector.

DETAILED DESCRIPTION OF THE INVENTION

The present invention is directed to highly efficient funneling of light enhanced in intensity through deep subwavelength apertures facilitated by means of a nonresonant mechanism. An exemplary structure comprises periodic interconnected apertures comprising rectangular sub-apertures of two different sizes operating under normal incidence. The larger sub-aperture aids the coupling of the incoming light, while a significant fraction of the incident power is funneled through the smaller sub-aperture. The nonresonant operation renders the exemplary structure functional in a very broad wavelength range, starting from 3 µm and continuing well into far-IR wavelengths. The broadband functionality allows for flexible utilization in many applications, thus considerably relaxing the stringent design requirements of resonant devices. As described below, the exemplary structure functions as a broadband nonresonant platform that funnels power through a region as small as (~λ/500)² (at a 20 µm wavelength) accompanied by highly enhanced electromagnetic fields.

Figure 1:
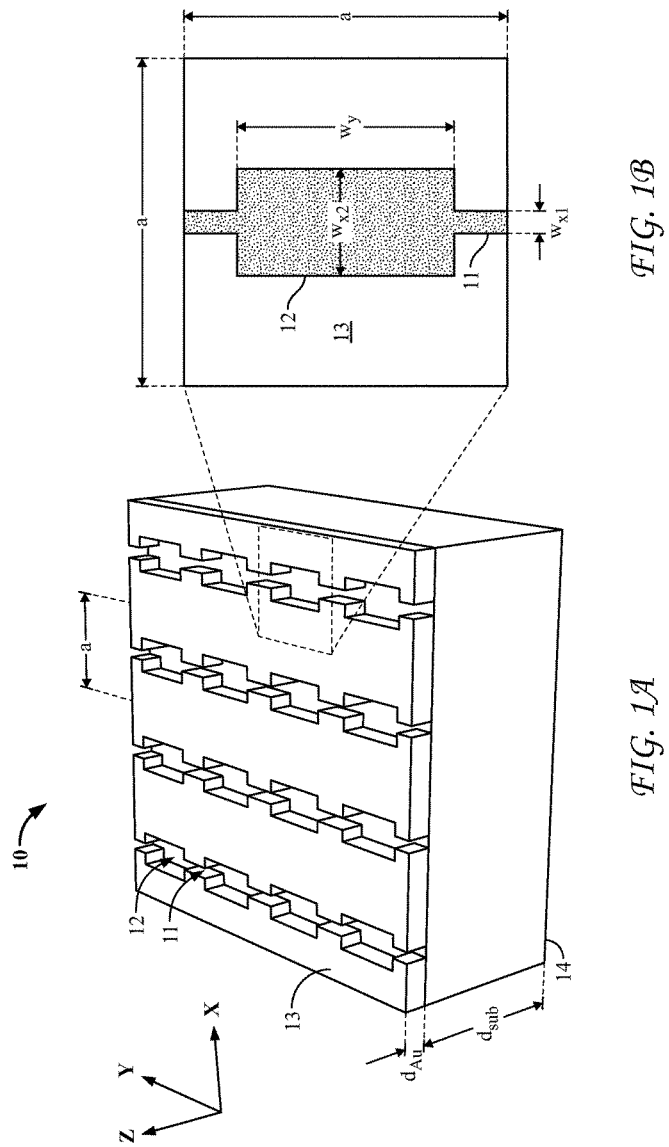
FIG. 1(a) is a schematic perspective-view illustration of an exemplary structure of the present invention comprising a gold patterned film of thickness $d_{Au}$ resting on a $d_{sub}$ thick substrate.
FIG. 1(b) is a magnified top-view illustration of the a×a unit cell of the underlying square lattice, with the associated geometric features of the double-groove structure.

As shown in FIG. 1(a), the exemplary structure 10 comprises a square lattice of apertures of period a comprising alternating small 11 and large 12 rectangular sub-aperture slit structures engraved on a thin gold film 13 of thickness $d_{Au}$ resting on top a substrate 14 of refractive index of n=1.45 and thickness $d_{sub}$. The dimensions of the large and small slits are shown in FIG. 1(b). In the limit of $w_{x1}$=0, a rectangular-hole structure is obtained. When $w_{x1}$=$w_{x2}$, a wire-grid (WG) structure is obtained, which is widely used as a polarizer due to the polarization selective broadband transparency properties. See P. Yeh, *Opt. Commun.* 26, 289 (1978). Where neither $w_{x1}$=$w_{x2}$ nor $w_{x1}$=0, the structure is referred to hereinafter as a double-groove (DG) structure. The exemplary DG structure is especially useful in the mid- to long-wavelength infrared range (e.g., 3 µm to 20 µm).

The thin conducting film 13 is preferably opaque and has a thickness that is subwavelength (e.g., less than a few hundred nanometers). The top film 13 preferably comprises a noble metal, such as Au, although other metals (e.g., Al, Ag, Ni, Cu, W) and highly doped semiconductors (e.g., Si, GaAs, InGaAs, InP) can also be used. The dielectric substrate 14 is preferably transparent and insulating with a low refractive index (e.g., n<4) in the wavelength range of interest (e.g., glass, quartz, calcium fluoride, barium fluoride, silicon, GaAs, ZnSe). As will be apparent to those skilled in the art, other aperture structures (e.g., circular, elliptical, diamond-shaped, etc.), interconnected lattice geometries (e.g., rectangular, rhomboidal, etc.), and periodicities can also be used. Depending on the size of the apertures and the spatial periodicity of the lattice, the structure can operate in a wide wavelength range from the near- to the far-infrared (e.g., approximately 0.3 µm to about 1,000 µm).

To understand and explore the optical capabilities of the DG structure, the corresponding transmission spectrum between the wavelength range of 3-20 µm was studied numerically. A finite difference time domain (FDTD) approach was employed, alongside with the auxiliary differential equation method suitable for the modeling of the Drude dispersion for the permittivity [∈(ω)] in the time domain (∈(ω)=1.0−$\omega_p^2$/[ω(ω+iΛ)], with $\omega_p$=11.78×10$^{15}$ rad/sec, and Λ=0.0895×10$^{15}$ rad/sec. See S. Foteinopoulou et al., *Opt. Express* 15, 4253 (2007); and A. Taflove and S. C. Hagness, *Computational Electrodynamics: The Finite-Difference Time-Domain Method* (Artech House, Boston, 2005), 3rd ed. Parameters were determined from an optimal fit to the available data in the region between 1 and 10 µm from E. Palik, *Handbook of Optical Constants of Solids* (Academic, New York, 1985)). For comparison, five different structures (two DG structures, two WG structures, and one rectangular-hole structure) were considered. All were chosen to be deeply subwavelength to target the widest operation wavelength regime in the mid-IR while being realistically achievable with current nanofabrication methods. See J. Henzie et al., *Annu. Rev. Phys. Chem.* 60, 147 (2009).

Figure 2:
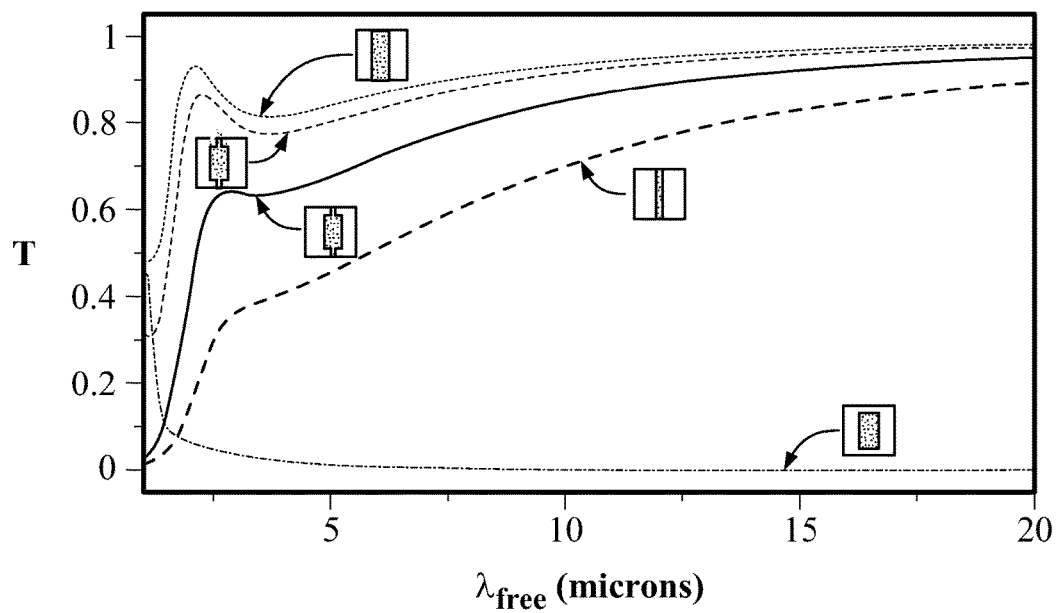
FIG. 2 is a graph of transmission (T) versus free space wavelength ($\lambda_{free}$) in microns for five variations of the exemplary double-groove structure. All structures have $d_{Au}$=50 nm, $d_{sub}$=500 nm, and $w_y$=200 nm, but with the corresponding unit cell features, $w_{x1}$ and $w_{x2}$, varied as indicated by the adjacent icons.

FIG. 2 shows the simulation results for the transmission (T) versus the free space wavelength, $\lambda_{free}$, for a plane wave impinging the structure normally along the z direction, with the electric field polarized along the x direction. All the exemplary structures considered have the following feature-size parameters in common: a=300 nm, $d_{Au}$=50 nm, $d_{sub}$=500 nm, and $w_y$=200 nm. A very low transmission is observed for the rectangular structure ($w_{x1}$=0 nm and $w_{x2}$=100 nm), represented with the dot-dashed line in FIG. 2. This is expected for a structure comprised of closed shaped apertures for wavelengths above the EOT resonance. See H. A. Bethe, *Phys. Rev.* 66, 163 (1944); and C. J. Bouwkamp, *Rep. Prog. Phys.* 17, 35 (1954). On the other hand, all structures with unbounded (i.e., connected) apertures are highly transmissive. In particular, both DG structures—with ($w_{x1}$, $w_{x2}$)=(15 nm, 100 nm) and ($w_{x1}$, $w_{x2}$)=(50 nm, 100 nm), respectively remain highly transmissive throughout the 3-20 μm range. The corresponding transmission (solid and short-dashed lines in FIG. 2) lies between that of the 100-nm WG (dotted line) and the 15-nm WG (long-dashed line). The transmission drops sharply around $\lambda_{free}$~3 μm when the incoming fields start to sense the spatial periodicity of the structures. Interestingly, the reduction in total transmission of the DG structures, in reference to the 100-nm WG transmission (dotted line), is disproportionate with respect to the reduction in $w_{x1}$, with $w_{x1}$=50 nm (short-dashed line) showing negligible change and $w_{x1}$=15 nm (solid line) showing a maximum reduction of ~20%.

Figure 3:
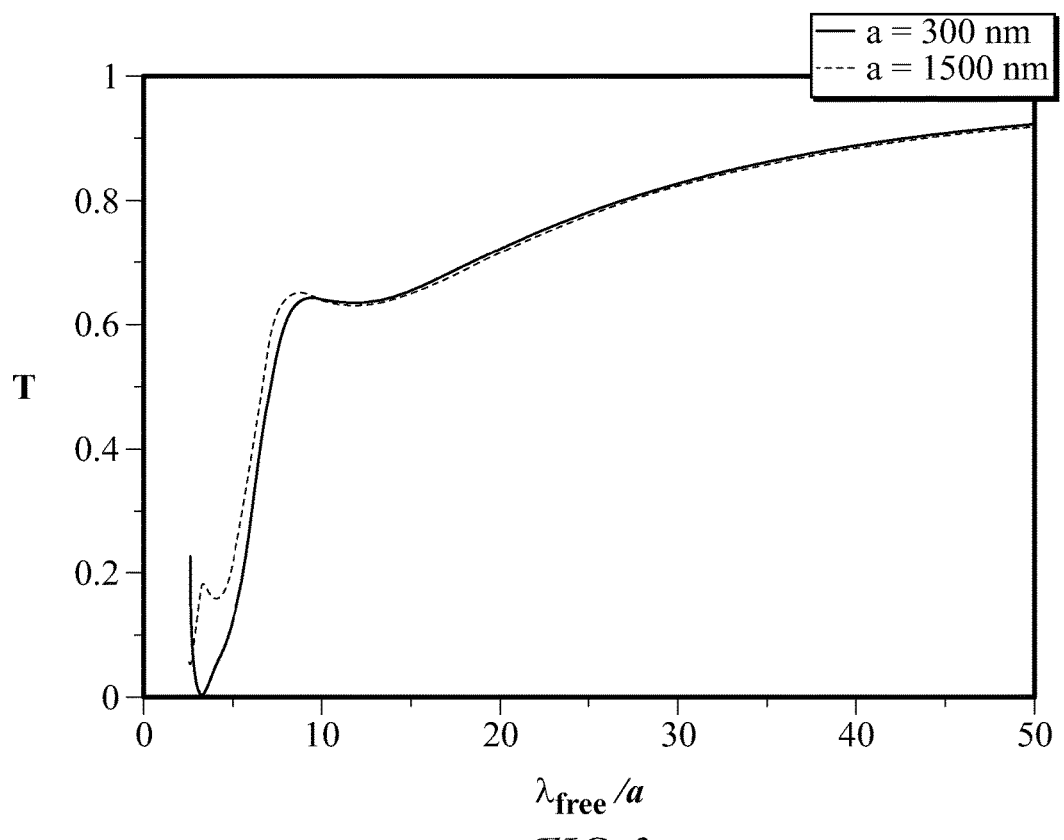
FIG. 3 is a plot of transmission as a function of reduced wavelength ($\lambda_{free}$/a) for two DG structures with lattice constants of a=300 nm and a=1500 nm, respectively.

FIG. 3 is a plot of transmission as a function of reduced wavelength ($\lambda_{free}/a$) for the DG structure with ($w_{x1}$, $w_{x2}$)= (15 nm, 100 nm) and lattice constant of a=300 nm and a scaled DG structure with a lattice constant of a=1500 nm. All geometric features of the latter DG structure are scaled to the ratio of the two lattice constants. Again, the transmission drops sharply around $\lambda_{free}/a$~10, when the incoming fields start to sense the spatial periodicity of the DG structure.

Figure 4A:
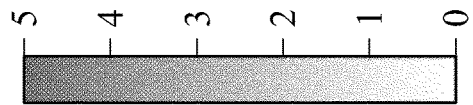
FIGS. 4(a)-(d) are graphs of the spatial field distribution of the electric field amplitude, normalized to an input field of 1 V/m, at the middle of the Au film for the structures with (a) $w_{x1}$=15 nm, $w_{x2}$=100 nm; (b) $w_{x1}$=50 nm, $w_{x2}$=100 nm; (c) $w_{x1}$=$w_{x2}$=15 nm; and (d) $w_{x1}$=$w_{x2}$=100 nm.
Figure 4B:
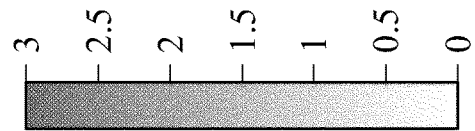
Figure 4C:
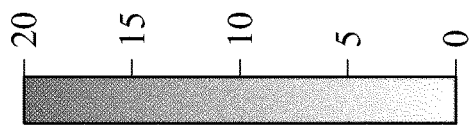
Figure 4D:

FIGS. 4(a)-(d) show the calculated spatial distributions of the modal electric field (magnitude of the x component) normalized to the incident electric field at a wavelength of 10 μm at the middle of the Au film for the structures depicted in FIG. 2. The corresponding field map for the structure of FIG. 4(a), but 20 nm within the substrate, is shown in FIG. 8(a). The simulations were performed using an FDTD approach. Small field values were observed for the rectangular-hole structure (not shown in FIG. 4). For the DG structures (shown in FIG. 4(a) and FIG. 4(b)), a highly enhanced field is observed in the small-gap region—which is higher the narrower the small-gap slit—and a small field in the large-gap region. Also, the electric fields remain nearly uniform in the small- and large-slit regions, except for a small fringing at the sharp interface between the two slits. The two WG structures in FIGS. 4(c) and 4(d), representing the extreme cases for FIGS. 4(a) and 4(b) with $w_{x2} \to w_{x1}$=15 nm and $w_{x1} \to w_{x2}$=100 nm, respectively, show lower field enhancement values. Strikingly, for both the DG structures, a closer examination of the ratio of the x component of the electric field in the middle of the small and large slit reveals it to be very close to the ratio $w_{x2}/w_{x1}$.

This ratio is further examined throughout the spectrum of interest (3-20 μm) for the DG structures of FIGS. 4(a) and 4(b), as shown by the results in FIG. 5(a). The dark solid line represents the result for the 15-nm DG structure of FIG. 4(a) and the light solid line represents the result for the 50-nm DG structure of FIG. 4(b). The dashed (dotted) lines represent the expected result from a quasi-static analysis in the long-wavelength limit for the DG structures. Indeed, within this wavelength regime, $E_S/E_L \sim w_{x2}/w_{x1}$, with $E_S$ and $E_L$ being the electric field amplitude in the center of the small and large slits, respectively. This can be explained with a simple quasi-static picture, wherein the electrons in the metal respond nearly instantaneously to the incident field. The charges build up across the gaps as depicted in the schematic shown in FIG. 5(d). The monitoring points are taken at the middle of the Au film. Their locations with respect to the structural unit cell, for the $E_S$ and $E_L$ fields, are also indicated. The potential difference across the small slit [points (1) and (2)] is equal to the potential difference across the large slit [points (3) and (4)]. This implies a uniform electric field in each respective slit region with no phase difference and an amplitude ratio equal to the inverse of the ratio of the respective widths, as has been observed. In the long-wavelength regime, the structures are assumed to be nearly transparent (i.e., almost zero reflection). The continuity of the tangential component of the electric field is applied at the interface, but averaged over the structural unit cell, to obtain $$\frac{E_L w_{x2} w_y + E_S w_{x1}(a - w_y)}{a^2} \cong E_0 \quad (1)$$

with $E_0$ being the source amplitude. See J. D. Jackson, *Classical Electrodynamics* (Wiley, New York, 1999), 3rd ed. Using in conjunction the quasi-static condition for the $E_S/E_L$ ratio, $$\frac{E_L}{E_0} \cong \frac{a}{w_{x2}} \quad (2a)$$

$$\frac{E_S}{E_0} \cong \frac{a}{w_{x1}} \quad (2b)$$

This simple long-wavelength picture predicts the ratios $E_L/E_0$ [line labeled as $a/w_{x2}$ in FIG. 5(b)] and $E_S/E_0$ [lines labeled as $a/w_{x1}$ in FIG. 5(c)] very well for both considered DG structures down to the 10 μm wavelength, below which it starts to deviate, nevertheless remaining a reasonable estimate down to 3 μm. This is not surprising, as the assumption of near transparency is not valid going towards shorter wavelengths. For the 15-nm WG structure [long-dashed line in FIG. 5(c)], the deviation from the long wavelength limit is larger in comparison to the 15-nm DG structure. Furthermore, the DG structure with $w_{x1}$=15 nm outperforms the WG structure both in terms of achieved electric field enhancement and in terms of transmission. It is important to note, as seen in FIGS. 4(a) and 4(b), that a two-dimensional (2D) confinement of the enhanced optical field is found for the DG structures, a useful feature for controlling light-matter interaction. This is not the case for the WG structures shown in FIGS. 4(c) and 4(d).

Figure 6A:
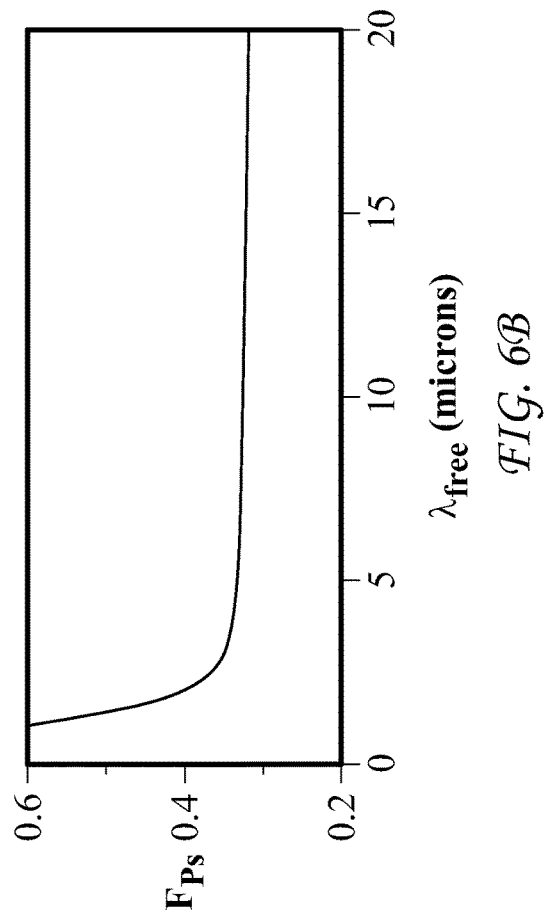
FIG. 6(a) is a spatial map of the Poynting vector, at the middle of the Au film, for the 10 µm incident wavelength for the DG structure of FIG. 4(a) (normalized to the incident Poynting vector).

It is of particular interest to evaluate how much power is carried through the small-gap region via the highly confined enhanced electric field. To illustrate this, consider the spatial distribution of the z component of the Poynting vector (time-average value), $S_z$ for the DG structure of $w_{x1}=15$ nm, where an electric field enhancement factor of about 20 and confinement of the order of $\sim(\lambda/250)^2$ is had in the small-slit area at 10 µm, as shown in FIG. 6(a). As expected, almost no power is transmitted through the metallic region while having a considerably larger power density in the small-slit region compared to the large-slit region. The corresponding Poynting vector map for the structure shown in FIG. 6(a), but inside the substrate at 20 nm below the bottom of the Au film, is shown in FIG. 8(b).

Figure 6B:
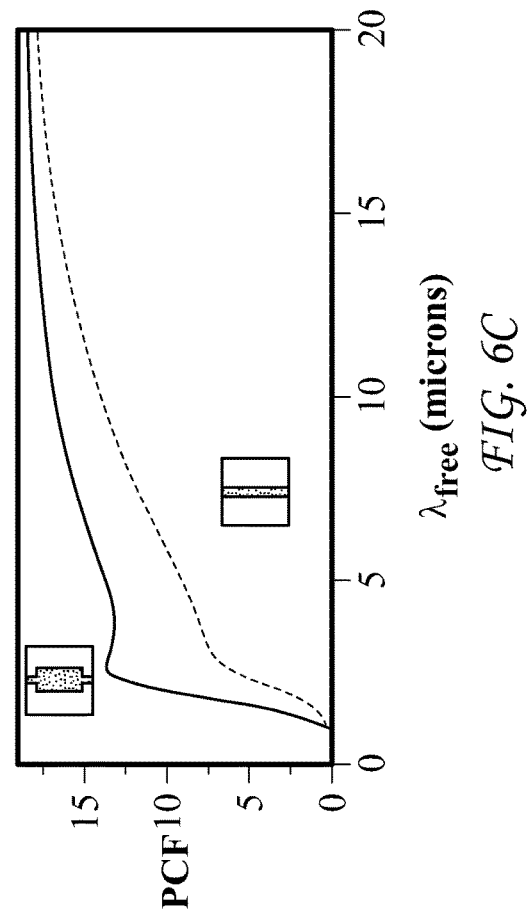
FIG. 6(b) is a graph of the corresponding ratio of the total power funneled through the small-gap region, $F_{Ps}$, versus free space wavelength.
Figure 6C:
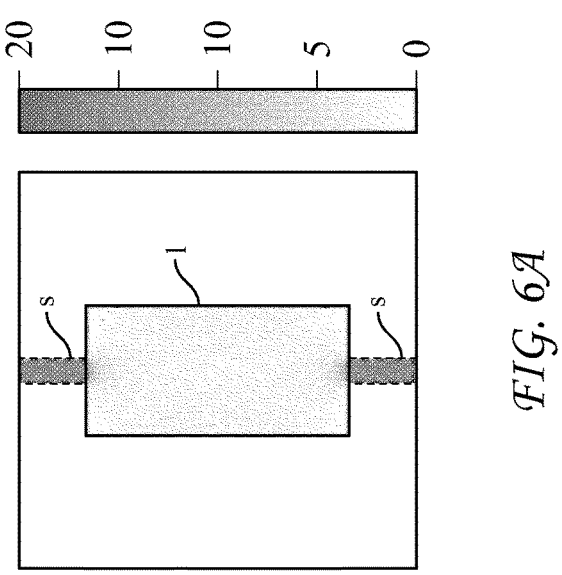
FIG. 6(c) is a graph of the comparison of the PCF versus free space wavelength for the DG structure (solid line) of FIG. 6(a) with the 15-nm WG result (dashed line).

The integrated $S_z$ in the small-slit region, $P_s$, and the large-slit region, $P_l$, for the DG structure of FIG. 6(a) within the unit cell was calculated. The respective areas of integration are designated "s" and "l" in FIG. 6(a). FIG. 6(b) shows the fraction of power that goes through the small slits, $F_{Ps}=P_s/(P_s+P_l)$, as a function of free space wavelength for such a structure. A large $F_{Ps}$ of about 30% remains nearly constant for the entire spectral region of interest. This is remarkable, considering that the small-slit region constitutes an area 60 times smaller than the unit cell area. At ~3 µm wavelength, the structural periodicity effects start to emerge, and a sharp increase in $F_{Ps}$ is observed with the total transmission having decreased sharply.

To quantify this behavior, it is useful to introduce a figure of merit, namely, the "power confinement factor" (PCF). PCF is defined as the fraction of the incident power that gets funneled through the small-slit region divided by the area fraction covered by the small-slit region, i.e., PCF=$TF_{Ps}a^2/A_s$, with $A_s$ being the area covered by the small grooves within the unit cell. It is analogous to the transmission enhancement factor in resonant EOT platforms. To illustrate this, the PCF for the 15-nm DG structure of FIG. 4(a) is compared to the 15-nm WG structure of FIG. 4(c) for the same unit cell dimension for consistency, although the WG does not really offer a 2D confinement. The PCFs for both structures are nearly equal (~18) at the 20 µm wavelength but decrease at different rates as shorter wavelengths are approached, with the PCF for the WG dropping much faster than the one for the DG structure. For example, near the 3 wavelength, the PCF for the DG structure is 13.5, while, for the WG, it is about 7.3, nearly half the value.

Figures 7A, 7B, 7C:
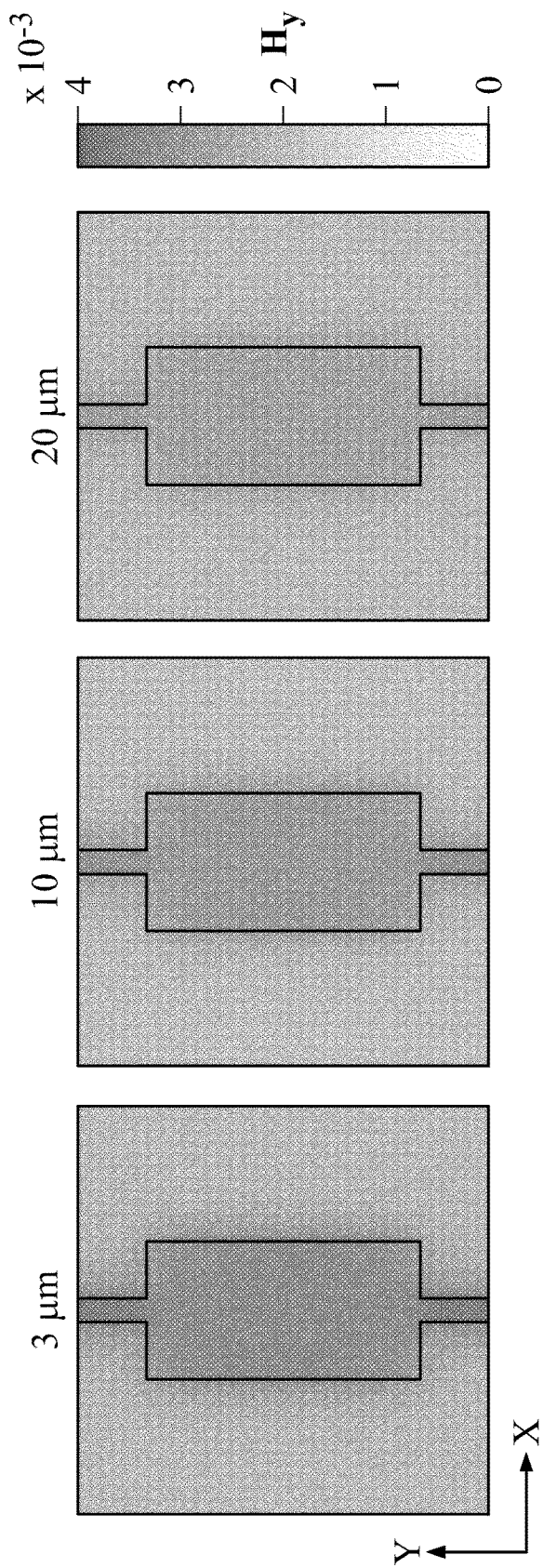
FIGS. 7(a)-(c) show the spatial field distributions of the amplitude of the y-component of the magnetic field ($H_y$) (in Nm) for the DG structure of FIG. 4(a), for 3 µm, 10 µm, and 20 µm wavelengths of the impinging EM wave.

FIGS. 7(a)-(c) show the magnetic field (y component) at three different wavelengths for the DG structure of FIG. 4(a). The incoming wave has an electric field amplitude $E_0=1$ V/m. So the magnetic field amplitude is $$H_0 = \sqrt{\frac{\varepsilon_0}{\mu_0}} E_0,$$

with $\varepsilon_0$, $\mu_0$ being the vacuum permittivity and permeability respectively, i.e. $H_0=2.65\times10^{-3}$ A/m. For this wavelength regime, an almost uniform magnetic field is observed. This enables estimation of the $F_{Ps}$ ratio equaling $1-w_y/a$ using the quasistatic-limit values for the electric fields [Eqs. (1) and (2)]. Hence, the PCF factor is equal to the field enhancement in the small-slit area [Eq. (2b)], implying that both can be simultaneously optimized. For the parameters of the structure of FIG. 6(a), $F_{Ps}$~33% is obtained, which is very close to the calculated value of ~30% that was described earlier with reference to FIG. 6(b). When moved away from the long-wavelength limit, the total transmission is better for the structures with the larger air area. The presence of the large sub-aperture enables a more efficient funneling of the enhanced fields through the small sub-aperture. This altogether implies the following: $w_{x2}w_y+w_{x1}(a-w_y)$ controls the total transmission (the higher the greater), $w_{x1}$ controls the enhancement factor of the fields within the slit and PCF factor (the smaller the greater), $w_y=a$ controls the power ratio that goes through the small slits where the field is dramatically enhanced (the smaller the greater), and $w_{x1}(a-w_y)$ controls the 2D confinement (the smaller the better; not applicable for WG). In other words, this exemplary structure offers three different independent structural parameters: $w_{x2}$, $w_{x1}$, and $w_y$. By appropriately tuning these parameters, one can control the localization and electric field enhancement, and power confinement, as well as electromagnetic energy transmission through the structure as necessary across a broad wavelength regime, pertinent to application-specific demands.

The present invention has been described as broadband light funneling in ultrasubwavelength channels. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A structure for broadband light tunneling, comprising a two-dimensional periodic array of unit cells in a thin conducting film, wherein the unit cells have a first periodicity in a first dimension and a second periodicity in a second dimension, wherein the unit cells are ultrasubwavelength to an incident light normal to the two-dimensional periodic array, wherein each unit cell comprises a single aperture that is connected to an aperture in an adjacent unit cell in the first dimension but not in the second dimension, and wherein each aperture comprises a large sub-aperture that aids in coupling of the incident light and a small sub-aperture that funnels a significant fraction of the incident light power, and wherein the wavelength of the incident light is between 0.3 pm and 1000 pm, and wherein the thin conducting film has a thickness in a third dimension orthogonal to the first and second dimensions and wherein the thickness of the thin conducting film is subwavelength to the incident light, and wherein the apertures are unfilled.

2. The structure of claim 1, wherein the large sub-aperture comprises a large rectangular slit and the small sub-aperture comprises a small rectangular slit, thereby providing a double-groove structure.

3. The structure of claim 2, wherein the small rectangular slit has a width $w_{x1}$ and the large rectangular slit has a larger width $w_{x2}$, and wherein neither $w_{x1}=w_{x2}$ nor $w_{x1}=0$.

4. The structure of claim 1, wherein at least one of the sub-apertures comprises a circular, elliptical, or diamond-shaped sub-aperture.

5. The structure of claim 1, wherein the thin conducting film comprises a metal or a highly doped semiconductor.

6. The structure of claim 5, wherein the metal comprises a noble metal.

7. The structure of claim 5, wherein the metal comprises Au, Al, Ag, Ni, Cu, or W.

8. The structure of claim 5, wherein the highly doped semiconductor comprises Si, GaAs, InGaAs, or InP.

9. The structure of claim 1, wherein the thin conducting film is disposed on a dielectric substrate that is transparent to the incident light.

10. The structure of claim 9, wherein the substrate comprises glass, quartz, calcium fluoride, barium fluoride, silicon, GaAs, or ZnSe.

11. The structure of claim 1, wherein the wavelength of the incident light is between 3 µm and 20 µm.

12. The structure of claim 1, wherein the unit cell comprises a square lattice with first and second periodicities equal to a and the incident light has a wavelength of $\lambda$, and wherein $\lambda/a$ is greater than approximately 10.

13. The structure of claim 12, wherein $\lambda/a$ is greater than approximately 100.

14. The structure of claim 1, wherein the periodic array comprises a square, rectangular, or rhomboidal lattice geometry.

15. The structure of claim 1, wherein the thickness of the thin conducting film is less than a few hundred nanometers.

* * * * *